US009612804B2

United States Patent
Lee et al.

(10) Patent No.: US 9,612,804 B2
(45) Date of Patent: Apr. 4, 2017

(54) BUSINESS SUITE FRAMEWORK FOR DEVELOPING SOFTWARE APPLICATIONS

(71) Applicants: Andrew Hei-Yin Lee, New South Wales (AU); Grantley McCauley, New South Wales (AU); John V Papachristos, Victoria (AU); Fred Heida, New South Wales (AU)

(72) Inventors: Andrew Hei-Yin Lee, New South Wales (AU); Grantley McCauley, New South Wales (AU); John V Papachristos, Victoria (AU); Fred Heida, New South Wales (AU)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/479,451

(22) Filed: Sep. 8, 2014

(65) Prior Publication Data

US 2015/0074634 A1 Mar. 12, 2015

Related U.S. Application Data

(60) Provisional application No. 61/874,510, filed on Sep. 6, 2013.

(51) Int. Cl.
*G06F 9/44* (2006.01)
(52) U.S. Cl.
CPC ..................................... *G06F 8/34* (2013.01)
(58) Field of Classification Search
None
See application file for complete search history.

(56) References Cited

U.S. PATENT DOCUMENTS

| 7,124,400 B2* | 10/2006 | Mortensen ............... G06F 8/71 717/121 |
| 7,636,911 B2* | 12/2009 | Kristoffersen et al. ....... 717/108 |
| 7,685,598 B1* | 3/2010 | Badenell ................... G06F 8/65 717/173 |
| 7,827,525 B1* | 11/2010 | Navaro ......................... 717/108 |
| 8,504,981 B2* | 8/2013 | Hattori et al. ................ 717/106 |

(Continued)

OTHER PUBLICATIONS

Unisys Corp. Agile Business Suite. Component Enabler User Guide. Release 3.0. Nov. 2012. available at <https://public.support.unisys.com/abs/docs/abs3_0/3826%205872.pdf>.*

*Primary Examiner* — Matthew Brophy
(74) *Attorney, Agent, or Firm* — Robert P. Marley; Richard J. Gregson

(57) ABSTRACT

A system modeler may provide a framework for the development of business applications using object oriented concepts. The framework may expose selected attributes of these classes through a Graphical Presentation Interface. When a Graphical Presentation Interface is defined for a class, System Modeler may automatically generate a project containing the corresponding DataModels that can be used by Client Application developers in a variety of Client technologies. The generated DataModels may be synchronized with any changes made to the class definitions in System Modeler. When an attribute is modified in the System Modeler class, then the change will automatically filter through to the corresponding DataModels used by the Client Application.

16 Claims, 8 Drawing Sheets

(56) References Cited

U.S. PATENT DOCUMENTS

| | | | | |
|---|---|---|---|---|
| 8,533,723 | B1 * | 9/2013 | Badenell | G06F 8/65 |
| | | | | 717/177 |
| 8,578,330 | B2 * | 11/2013 | Dreiling | G06F 8/34 |
| | | | | 717/104 |
| 2004/0111428 | A1 * | 6/2004 | Rajan | G06F 9/547 |
| 2004/0133445 | A1 * | 7/2004 | Rajan | G06Q 10/067 |
| | | | | 717/108 |
| 2004/0187140 | A1 * | 9/2004 | Aigner | G06F 8/20 |
| | | | | 719/328 |
| 2005/0027559 | A1 * | 2/2005 | Rajan | G06Q 10/067 |
| | | | | 705/50 |
| 2005/0050537 | A1 * | 3/2005 | Thompson et al. | 717/165 |
| 2006/0173893 | A1 * | 8/2006 | Kristoffersen et al. | 707/102 |
| 2006/0206858 | A1 * | 9/2006 | Becker et al. | 717/104 |
| 2007/0079299 | A1 * | 4/2007 | Daly | G06F 8/30 |
| | | | | 717/141 |
| 2007/0226196 | A1 * | 9/2007 | Adya | G06F 17/30457 |
| 2008/0195651 | A1 * | 8/2008 | Rachmiel | G06F 21/604 |
| 2010/0011337 | A1 * | 1/2010 | Young et al. | 717/104 |
| 2012/0102414 | A1 * | 4/2012 | Demant | G06F 17/3089 |
| | | | | 715/753 |
| 2014/0068583 | A1 * | 3/2014 | Tejani | G06F 8/63 |
| | | | | 717/163 |
| 2015/0074634 | A1 * | 3/2015 | Lee et al. | 717/104 |

* cited by examiner

BUSINESS SUITE FRAMEWORK FOR DEVELOPING SOFTWARE APPLICATIONS

CROSS-REFERENCE TO RELATED APPLICATIONS

The application claims the benefit of priority of U.S. Provisional Patent Application No. 61/874,510, filed on Sep. 6, 2013, and entitled "Agile Business Suite Client Framework," which is hereby incorporated by reference.

FIELD OF THE DISCLOSURE

The instant disclosure relates to application development. More specifically, this disclosure relates to a framework for supporting the development of computer software applications.

BACKGROUND

Conventionally, computer software is developed line-by-line, function-by-function, and file-by-file. Organization of the contents of the computer software through many functions and files is left to the developer. However, the large number of ever-changing staff in the development of the computer software can create organization problems with managing a computer software application over the lifetime of the application. Making changes to the software application when needs of the organization change can then be difficult due to lack of organization of the contents of the software application. Furthermore, an interface for accessing a conventional framework by computer software limits the capabilities of a software application. One example of a conventional framework is shown in FIG. 1.

FIG. 1 is a block diagram illustrating a conventional client application framework. A framework 100 may include a runtime 112 accessed through an external interface 110 through a COM/DCOM object 108. Components or client applications 102 and 104 may access the runtime 112 through the COM/DCOM object 108 directly or indirectly through an existing protocol adapter 106. However, the framework of FIG. 1 provides limited flexibility and extensibility to a developer of a Client Application.

SUMMARY

A model-based development of computer software may decrease development time for new or modified computer applications within an organization. For example, a data or behavioral model may be modified and an updated software framework generated by a system modeler. A Client Application developer may then build on top of the generated software framework. Later, when changes are made to the data or behavioral models, the framework may be regenerated with little or no interaction from the Client Application developer.

One such system modeler is the Agile Business Suite System Modeler, which may enable the development of business applications using object-oriented concepts. Classes can be defined to represent the data and behavior of the application. The new Client Framework exposes selected attributes of these classes through a Graphical Presentation Interface. When a Graphical Presentation Interface is defined for a class, the System Modeler may automatically generate a .NET Framework project containing the corresponding DataModels that can be used by Client Application developers in a variety of Client technologies. The generated DataModels may be synchronized with any changes made to the class definitions in System Modeler. When an attribute is modified in the System Modeler class, the change may automatically filter through to the corresponding DataModels used by the client application. This may enable a streamlined mechanism for delivering updates to the Client Application developer so that they can integrate changes in their application based on the latest DataModel definitions. In this way, the Client Framework may keep the client applications synchronized with the class definitions in System Modeler, and may help to avoid the typical runtime failures that would otherwise be incurred.

The Client Framework may support a variety of client technologies and System Modeler will generate different artefacts for each client type: for WINDOWS Presentation Foundation clients, the system modeler may generate DataViewModels and Datasources, in addition to the DataModels. This may assist developers using XAML-based technologies to design user interfaces with the WPF Designer or Blend. A corresponding set of Portable Datamodels may also be generated for client technologies that require them (e.g. WINDOWS 8, Silverlight, WINDOWS Phone 8); for technologies using Javascript, a set of DataModels may be generated as Javascript objects. In some cases, these additional artifacts may also be synchronized automatically with any changes made to the class definitions in System Modeler, thereby keeping all clients in sync with the AB Suite Model.

According to one embodiment, a method may include the steps of receiving, at a system modeler, a class comprising a plurality of attributes defining data and behavior of an application; receiving, at the system modeler, a selection of at least a portion of the plurality of attributes for exposing through a graphical presentation interface; and generating, by the system modeler, a software framework project comprising a data model based, at least in part, on the received selection and the received class.

According to another embodiment, a computer program product may include a non-transitory medium having code to perform the steps of receiving, at a system modeler, a class comprising a plurality of attributes defining data and behavior of an application; receiving, at the system modeler, a selection of at least a portion of the plurality of attributes for exposing through a graphical presentation interface; and generating, by the system modeler, a software framework project comprising a data model based, at least in part, on the received selection and the received class.

According to yet another embodiment, an apparatus may include a processor and a memory coupled to the processor. The processor may be configured to perform the steps of receiving, at a system modeler, a class comprising a plurality of attributes defining data and behavior of an application; receiving, at the system modeler, a selection of at least a portion of the plurality of attributes for exposing through a graphical presentation interface; and generating, by the system modeler, a software framework project comprising a data model based, at least in part, on the received selection and the received class.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
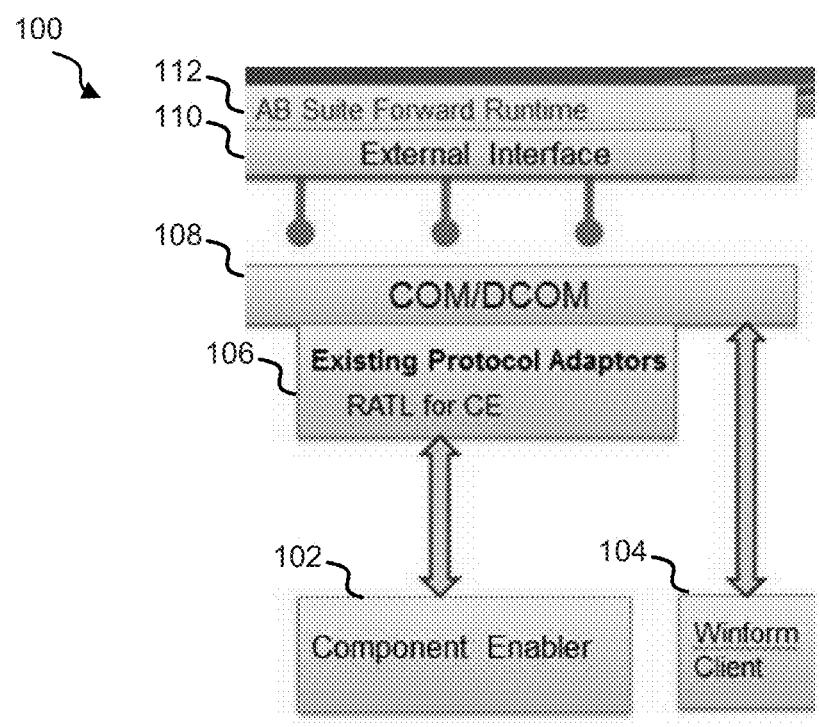
FIG. 1 is a block diagram illustrating a conventional client application framework.
Figure 2:
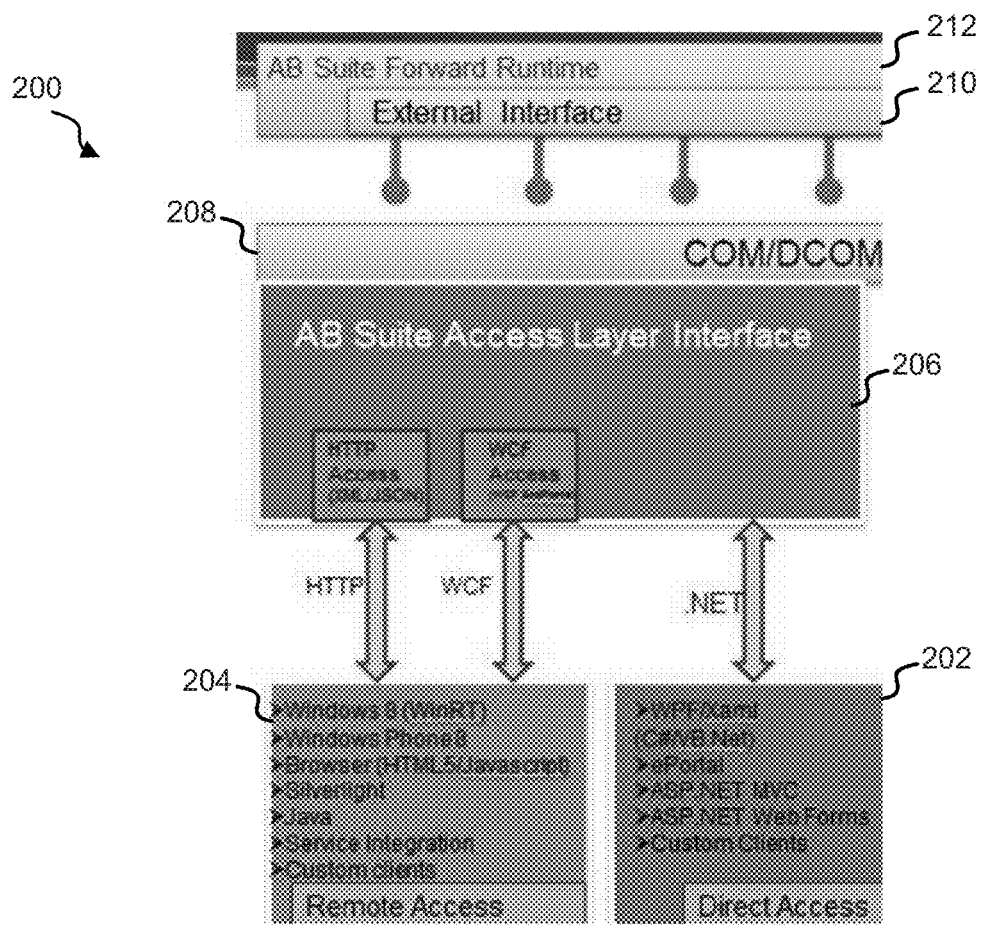
FIG. 2 is a block diagram illustrating a framework for developing client applications according to one embodiment of the disclosure.

FIG. 2 is a block diagram illustrating a framework for developing client applications according to one embodiment of the disclosure. A framework 200 may include a runtime 212 with an exposed external interface 210. The interface 210 may be accessed through a COM/DCOM block 208 by an interface 206. The interface 206 may provide access to the COM/DCOM block 208 from a direct access client 202 or a remote access client 204. A remote access client 204 may access the interface 206 through, for example, HTTP or WCF protocols. A direct access client 202 may access the interface 206 through a .NET method.

The Client Framework may deliver an open approach to user interface development by integrating industry-standard interfaces with Data Model concepts to provide a natural and intuitive environment for .NET Developers when designing end-user middleware and service based applications that connect to AB Suite systems. This may be achieved through the AB Suite Access Layer API 206 that is part of the Client Framework infrastructure. The API 206 may provide a new way to access the AB Suite runtime application. In addition, System Modeler may be used by the Client Framework to provide seamless integration and synchronization with client applications being developed.

The Client Framework may take ispec and class interface definitions in the AB Suite model to produce components that can be integrated into your client technology project. In System Modeler, ispecs and classes can define a graphical presentation interface, which is exposed as a set of corresponding DataModels that can then be used by many popular client development tools to create desktop, web, mobile, and service based applications. Examples of such client development tools are WINDOWS Presentation Foundation (WPF), SilverLight, ASP.NET MVC, WINDOWS Communication Foundation (WCF), WINDOWS 8, WINDOWS Phone 8, and others that are based on MICROSOFT .NET technology.

Some elements of the Client framework may include: Client Framework Development integrated into System Modeler, a Graphical presentation attribute definition, and/or a Client Framework Runtime Environment. In one embodiment, a mashup view may be used to display data from multiple ispecs to create an integrated experience. A mashup View may be created by extending the DataViewModel of a specific ispec. This may involve creating a partial class of the DataViewModel that is generated when you generate the access layer. This may allow a DataViewModel to be extended without the risk of overriding the changes made by when regenerating the DataViewModel.

Referring back to FIG. 2, the access layer interface 206 may be accessed through an AB Suite Access Layer Application Programming Interface (API) for connecting a client to the runtime system. This API may be part of the Client Framework infrastructure. It may deliver an open approach for .NET-based user interface development by integrating industry standard interfaces with Data Model concepts. This may provide a natural and intuitive environment for .NET developers when designing end user, middleware, and service based applications that connect to AB Suite systems. The API may be exposed, for example by: (1) a set of .NET assemblies that provide classes and interfaces for connecting and performing transactions against the runtime system, referred to as a "Direct Connection," for client technologies such as WINDOWS Presentation Foundation (WPF)/Extensible Application Markup Language (XAML), ASP.NET, and WINDOWS Communication Foundation (WCF) Service Applications; and/or (2) a WCF Service Gateway hosted on an Application Server (this may or may not be the same machine that the AB Suite system is running on), referred to as a "Remote Connection" and allows client applications that do not support COM/DCOM to use the Access Layer API across a network using WCF, for client technologies such as SILVERLIGHT and WINDOWS Store apps.

The API may allow a client interaction to interact with the AB Suite system through: (1) a direct interface that can interoperate with COM/DCOM, such as the Access Layer API for direct connections use the .NET compatible Data Models generated by the Client Framework; and/or (2) a remote interface for client applications that cannot interoperate with COM/DCOM. In one embodiment, the API for the direct and remote connections may be exposed in the same way to the application developer. This allows for the development of code for runtime interactions in a consistent manner, regardless of the connection mechanism being used.

Behind the scenes, client applications that obtain direct connections access COM/DCOM directly and client applications that obtain remote connections communicate through an intermediary gateway using WCF. In some embodiments, client applications may access the API through both direct and remote connections.

The API may expose one or more assemblies that may be referenced by the client application. For direct clients, an ABSuiteAccessLayer.Connector.Core.dll assembly may be exposed, which includes the interfaces exposed by the Access Layer API for all connections to the runtime system, and/or an ABSuiteAccessLayer.Connector.dll assembly may be exposed, which includes the implementation of the classes and methods exposed by the Access Layer API for direct connections to the runtime system. For remote clients, an ABSuiteAccessLayer.Connector.Core.dll may be exposed, which includes the interfaces exposed by the Access Layer API for all connections to the runtime system, and/or an ABSuiteAccessLayer.Connector.Remote.Core assembly may be exposed, which includes the implementation of the Access Layer API for remote connections through the WCF Gateway to the runtime system.

The API may include a number of components including, for example, an IConnection interface that provides methods and properties for establishing and maintaining a connection to the runtime system, an IRtConnection interface that provides methods and properties for exchanging data with the runtime system, a TransmissionObject used when sending and receiving data to or from the runtime system, and/or a DataModel that defines an ispec or a class that was modelled in AB Suite Developer and generated for Access Layer API usage.

Using the API while developing a client application may involve performing a method comprising: instantiating a connection object using the static ConnectionFactory class that returns an instance of a Connection object when calling the Create( ) method; creating a new ConnectionDetails object and setting its properties with information about how to connect with the host application; performing a Connect( ) call on the Connection object, passing in the ConnectionDetails, which returns a TransmissionObject from which you can determine the status of the connection and the current DataModel; populating the DataModel with new information by setting its properties; using the DataHandler object to send the DataModel details to the runtime system, with either the Transmit( ) or TransmitAsync( ) methods; returning, from the Transmit( ) or TransmitAsync( ) methods, an updated Transmission object that indicates the resulting state of the transaction and provides an updated DataModel, which may be for the same ispec or a new ispec; repeating some of the above steps to perform additional transactions with the runtime system; and closing the connection using the Connection object Close( ) method. Psuedocode illustrating one implementation described above is:

```
// Create a new connection to the AB Suite host system
    // Use the Access Layer API ConnectionFactory to create an instance of a Connection Interface
    class
        ABSConnection = ConnectionFactory.Create(new
Sample.Custom.DataModels.Core.IspecFactory( ));
    // Set up the ConnectionDetails object with information from Web.config
    ConnectionDetails cDetails = new ConnectionDetails( )
    {
        Host = "localhost",
        IsAnonymous = true,
        System = "Sample,
        ForceLogin = true,
        AssemblyLocation = @"C:\ABSuite\Datamodels",
        LogFolder=@"CC:\Temp",
        LogLevel="DEBUG"
    };
    TransmissionObject trObj = ABSConnection.Connect(cDetails; null);
    if (trObj != null && (trObj.State == TransmissionReturnCode.Ok || trObj.State == TransmissionReturnCode.OkWithSwitch))
    {
        SessionConnected = true;
        CurrentIspecName = trObj.ObjectClassName;
    }
    else
        SessionConnected = false;
    // Create an instance of a PRODModel class.
    PRODModel pModel = (PRODModel)
ABSConnection.DataHandler.GetDataModetObject("PROD");
    // Populate the PRODModel
    pModel._UserMAINT ="FIR";
    // Transmit the PRODModel to the host system
    TransmissionObject tObject = ABSConnection.DataHandler.Transmit(pModel);
    // Check the return state and whether the current context is for the PROD ispec
    if (tObject.State == TransmissionReturnCode.Ok)
    {
        // Check the DataModel type in the returned TransmissionObject, using the ObjectClassName
        // as the name of the Ispec. If it is a type of PRODModel, extract the data.
        if (ABSConnection.DataHandler.GetDataModelType(tObject.ObjectClassName) == typeof(PRODModel))
        {
            // Extract the Data from the PRDOModel object returned by the Connector.
            pModel = (PRODModel)tObject.Datamodel;
            string Name = pModel.NAM;
```

```
    string ID = pModel.PRODUCT;
    decimal price = pModel.SELLPRICE;
    Int32 reOrderLevel = pModel.REORDLEV;
    }
  }
}
// Close the connection
ABSConnection.Close( );
```

Figure 3:
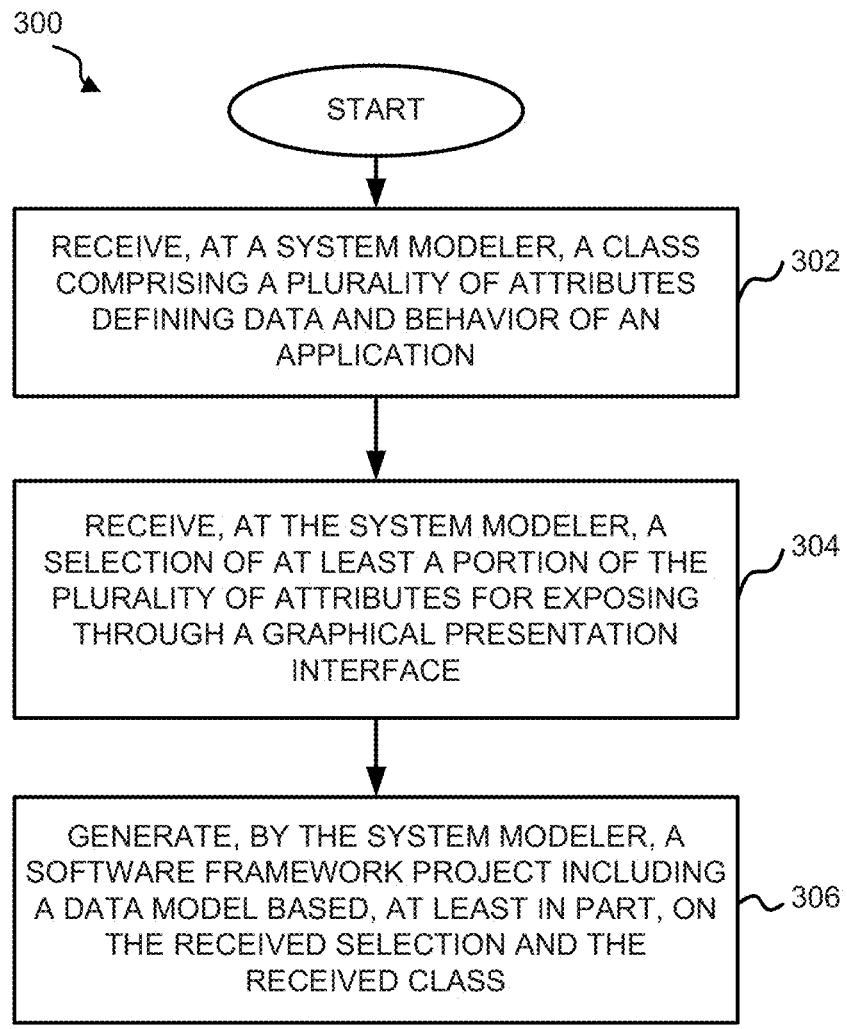
FIG. 3 is a flow chart illustrating a method of developing a software framework according to one embodiment of the disclosure.

FIG. 3 is a flow chart illustrating a method of developing a software framework according to one embodiment of the disclosure. A method 300 may begin at block 302 with receiving, at a system modeler, a class comprising a plurality of attributes defining data and behavior of an application. Then, at block 304, the system modeler may receive a selection of at least a portion of the plurality of attributes for exposing through a graphical presentation interface. Then, at block 306, the system modeler may generate a software framework project include a data model based, at least in part, on the received selection and the received class.

Figure 4:
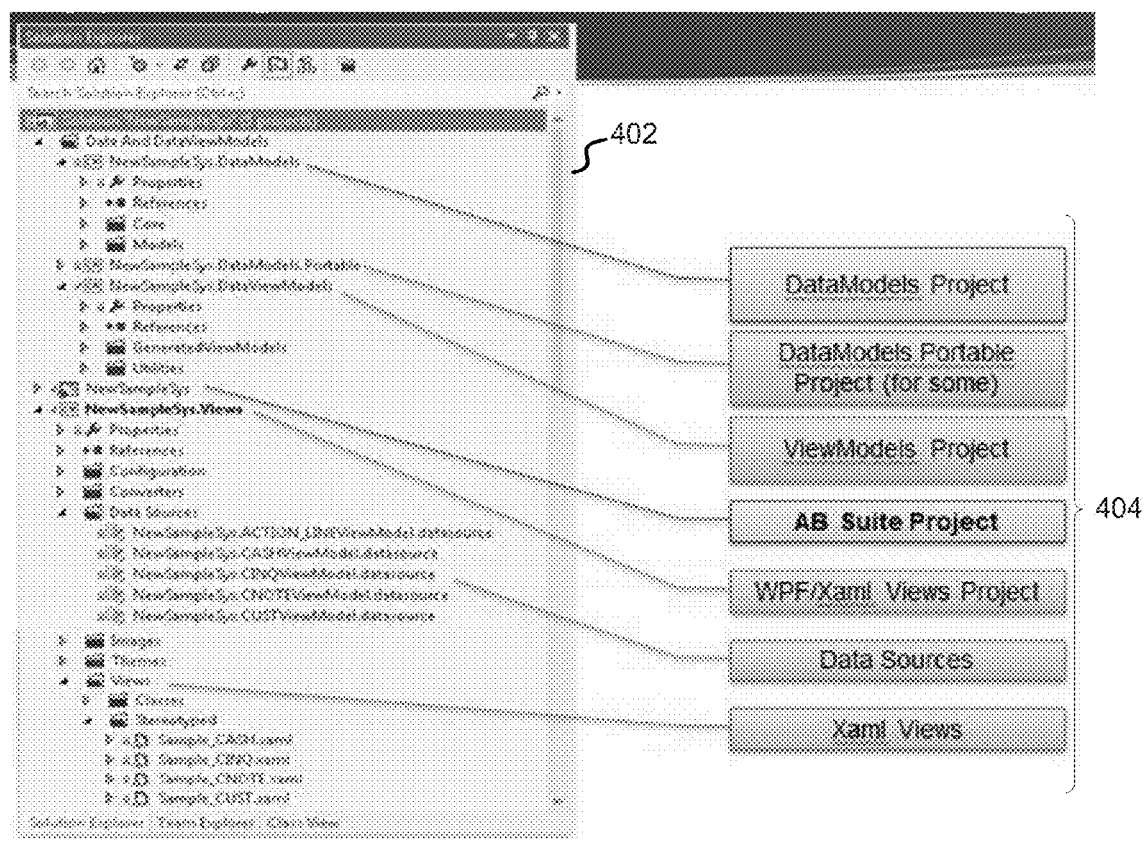
FIG. 4 is a block diagram illustrating a supporting client infrastructure for a software framework that may be generated by a system modeler according to one embodiment of the disclosure.

In one embodiment, of the method 300 of FIG. 3, the system modeler may also generate a supporting client infrastructure for the software framework project. One example of such a client infrastructure is shown in FIG. 4. FIG. 4 is a block diagram illustrating a supporting client infrastructure for a software framework that may be generated by a system modeler according to one embodiment of the disclosure. A supporting infrastructure 400 may include components 404. The components 404 may include, for example, a DataModels project, a DataModels.Portable Project, a ViewModels Project, an AB Suite Project, a WPF/XAML Views Project, one or more Data Sources, and/or one or more XAML views.

Figure 5:
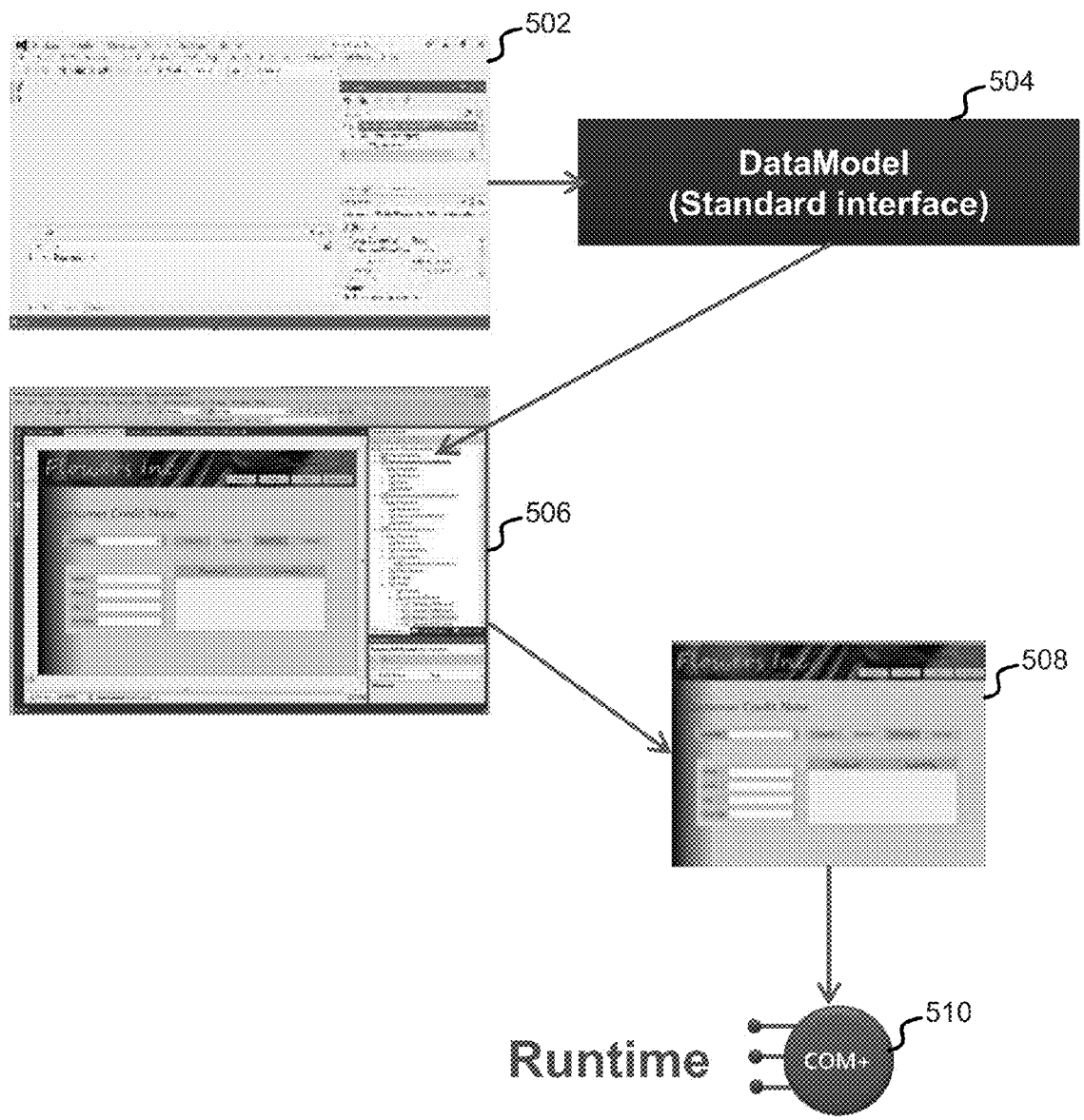
FIG. 5 is a block diagram of a client application according to one embodiment of the disclosure.

FIG. 5 is a block diagram of a client application according to one embodiment of the disclosure. A user interface 502, such as the Agile Business Suite, may provide a standard interface for developing a data model 504. An interface 506 for interacting with the data model 504 may then be developed. The interface 506 may be compiled into a client application 508, which accesses a runtime 510 through an API to an interface, such as interface 206 of FIG. 2.

A basic model-view-controller (MVC) application may be created, such as that shown in FIG. 5, that integrates the DataModels generated by a Client Framework. The models for the Client Framework may be generated using System Modeler and can define the data to be exchanged for specific ispec transaction. The Views may be designed to create the user interface for the application. The Controller then processes the data received from a View and uses the DataModels to connect the Access Layer API to the Runtime AB Suite application to perform transactions. The DataModels generated by the Client Framework may integrate with this environment because they take advantage of the Scaffolding feature in ASP.NET MVC, which automatically generates Views based on DataModel definitions. Once the Views are generated, they can be styled to suit the application's user interface by using HTML5, CSS, and JavaScript.

Figure 6:
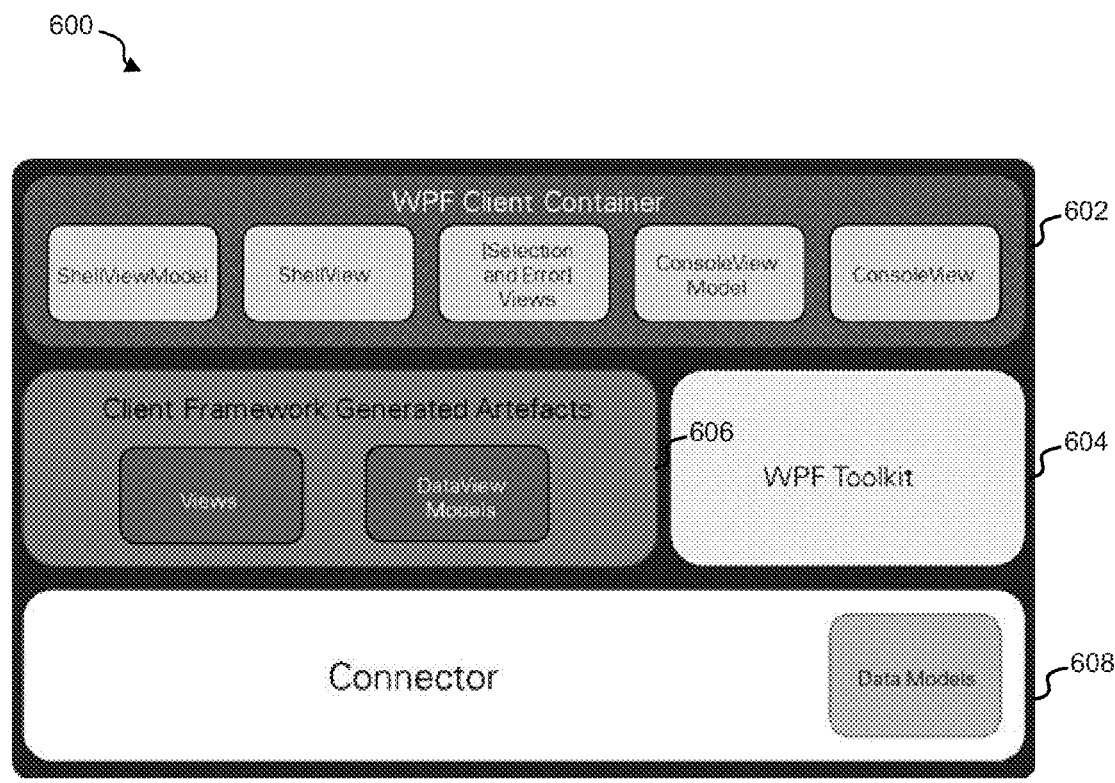
FIG. 6 is a block diagram illustrating components of a client application according to one embodiment of the disclosure.

FIG. 6 is a block diagram illustrating components of a client application according to one embodiment of the disclosure. A client application 600 may include a client container 602, a toolkit 604, framework generated artifacts 606, and a connector 608. The connector 608 may handle interactions between the client and the deployed system. In one embodiment, the connector 608 may use MEF to load a data model assembly at runtime. The data models may provide a .NET interface in conjunction with the connector 608. The artifacts 606 may be generated for folders that have a client technology property set to WPF or any other technology. For example, the artifacts generated for a WPF Client may include DataModel, DataViewModel, and Views. The toolkit 604 may include assemblies along with helper classes to handle conversion and display of data that are specific to an AB Suite System. In different embodiments, the toolkit 604 may include conversions for signed numbers, for name-to-image conversion, and for radio/button groups; attached behaviors for a background image loader, dynamic presentation attributes, textbox mask, auto-generating column for a datagrid, and toggle commands for radio or button groups; and/or helpers for printing and showing message boxes.

The client container 602 may be a standard C#, or other language, WPF application, which may include a ShellViewModel, a ShellView, SelectionAndErrorViews, a ConsoleView model, and/or a ConsoleView. The ShellViewModel class may be the main class of the WPF Client Container. This class may establish a connection with the AB Suite System, may load and populate the Views from the Views assembly, and may handle the menu and buttons available in the main window of the WPF Client Container. The ShellViewModel class may be a partial class that can be extended without changing the core definition of the class. The main window of the application may be encapsulated in the Shell class (Window class). This window may contain a toolbar, content presenter, and status bar. The toolbar may contain icons and menus that a user can use to open or close a session, run a report, and select a theme. The content presenter may host the Views from the Views assembly. The status bar may display status text and error messages sent by the host application.

A list of tasks that may be performed by the client container 602 may include: reading the configuration file (.rtxml) and instantiating the ShellViewModel and the Shell View classes at the Application Start-Up; loading, by the ShellViewModel, either a Direct or the Remote Connector assembly (based on a UseGateWay value in a configuration file), registering, by the ShellViewModel, for events sent by the Connector; loading, by the Connector, the DataModel assembly and create a session with the AB Suite system, and then allowing the ShellViewModel to invoke the FireUp ispec, if it exists; loading, by the ShellViewModel, the Views and DataModels assembly and showing the FireUp ispec sent by the Connector after creating the session (if there is no FireUp ispec, it displays the Select Screen dialog box; if a session is not established, the application shuts down); implementing, by the main window, a Shell.xaml file, where all user interface Views from the Views assembly may be displayed or hosted within this view; binding a user interface view from the Views assembly to its corresponding DataViewModel (data may be copied into the Data Model before a View is displayed and may be copied back into the Data Model before a Transmit). In one embodiment, the Shell.xaml file (or any other Window that appears in the container) may be customized to change the look and feel of the WPF application. In some embodiments, all user interface Views can be handled through data binding and by binding the Shell View to the ShellViewModel.

In one embodiment, a custom container may be constructed to allow customization of a client user interface. For example, an "Agile Business Suite WPF Container Project" template may provide a standard WPF Container provided with the default user interface design and logic (Views and ViewModels project files) as part of the project. This template may allow retaining of the basic behavior of the standard WPF Container of FIG. 6 with the flexibility of being able to customize the user interface for developing WPF- or XAML-based applications.

Benefits of the software framework described above may include: seamless integration of the client development project with the AB Suite project; a natural .NET development experience; exposing Ispecs and/or objects as DataModels; easier integration and passing in client development; allowing use any kind of new concept directly in the AB Suite Solution, as soon as it is available from other providers; standardization, and thus, greater customization options because many others know how to use DataModels; and/or improvements in performance and usability.

Figure 7:
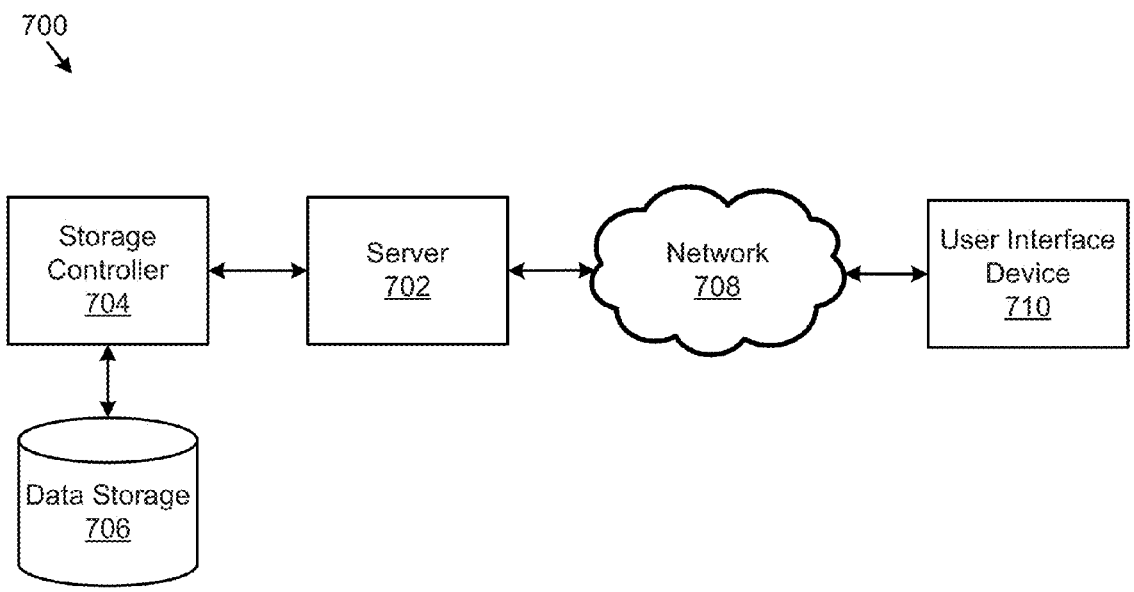
FIG. 7 is a block diagram illustrating a computer network according to one embodiment of the disclosure.

FIG. 7 illustrates one embodiment of a system 700 for an information system, including a system for generating software framework projects. The system 700 may include a server 702, a data storage device 706, a network 708, and a user interface device 710. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708.

In one embodiment, the user interface device 710 is referred to broadly and is intended to encompass a suitable processor-based device such as a desktop computer, a laptop computer, a personal digital assistant (PDA) or tablet computer, a smartphone, or other mobile communication device having access to the network 708. In a further embodiment, the user interface device 710 may access the Internet or other wide area or local area network to access a web application or web service hosted by the server 702 and may provide a user interface for controlling the information system.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 8:
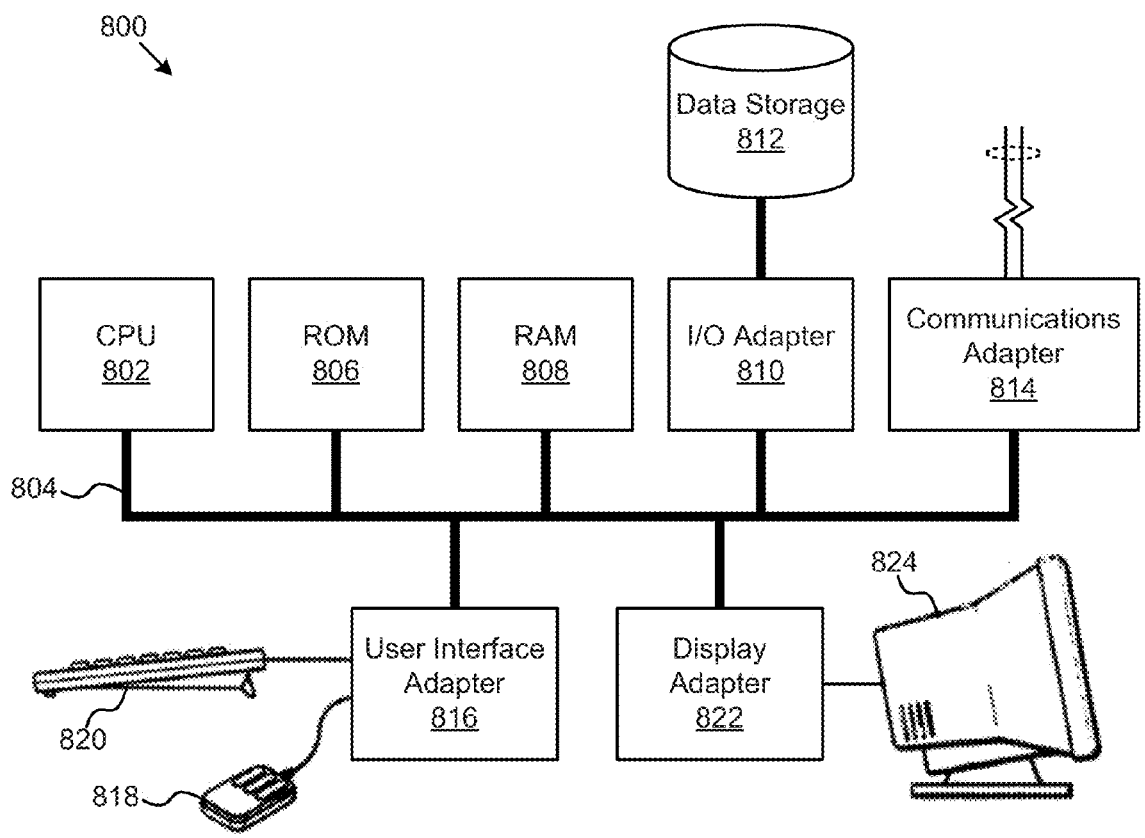
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. Although only a single CPU is shown, multiple CPUs may be present. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 may also include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The user interface adapter 816 couples user input devices, such as a keyboard 820, a pointing device 818, and/or a touch screen (not shown) to the computer system 800. The keyboard 820 may be an on-screen keyboard displayed on a touch panel. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of the server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    receiving, at a system modeler, a class comprising a plurality of attributes defining data and behavior of a client application;
    receiving, at the system modeler, a selection of at least a portion of the plurality of attributes for exposing through a graphical presentation interface;
    generating, by the system modeler, a software framework project comprising a data model based, at least in part, on the received selection and the received class;
    receiving an indication of a change in the class;
    updating, by the system modeler, the data model based, at least in part, on the change in the class; and
    automatically regenerating, by the system modeler, an updated version of the software framework project based on the updated data model;
    wherein the data model comprises a mashup view extending a DataViewModel as a partial class generated when an access layer is generated, the mashup view permits the DataView Model to be extended without a risk of overriding changes when regenerating the DatViewModel;
    wherein the system modeler, having a client framework development module integrated using interface data models containing graphical presentation attribute definitions, interfaces a client framework runtime environment, and operates on a server, and
    wherein the client application operates on a remote client.

2. The method of claim 1, wherein the software framework project comprises a .NET framework.

3. The method of claim 1, further comprising generating a client application based, at least in part, on the software framework project.

4. The method of claim 1, wherein the software framework project further comprises a data view model and a data source for consumption by windows presentation foundation clients.

5. The method of claim 1, wherein the software framework project further comprises a portable data model.

6. The method of claim 1, wherein the data model comprises a Javascript object.

7. A computer program product, comprising:
    a non-transitory computer readable medium comprising instructions which, when executed by a processor of a computer system, cause the processor to perform the steps of:
    receiving, at a system modeler, a class comprising a plurality of attributes defining data and behavior of an application;
    receiving, at the system modeler, a selection of at least a portion of the plurality of attributes for exposing through a graphical presentation interface; and
    generating, by the system modeler, a software framework project comprising a data model based, at least in part, on the received selection and the received class;
    receiving an indication of a change in the class;
    updating, by the system modeler, the data model based, at least in part, on the change in the class; and
    automatically regenerating, by the system modeler, an updated version of the software framework project based on the updated data model;
    wherein the data model comprises a mashup view extending a DataViewModel as a partial class generated when an access layer is generated, the mashup view permits the DataView Model to be extended without a risk of overriding changes when regenerating the DatViewModel;
    wherein the system modeler, having a client framework development module integrated using interface data models containing graphical presentation attribute definitions, interfaces a client framework runtime environment, and operates on a server, and
    wherein the client application operates on a remote client.

8. The computer program product of claim 7, wherein the software framework project comprises a .NET framework.

9. The computer program product of claim 7, wherein the medium further comprises instructions to perform the step of generating a client application based, at least in part, on the software framework project.

10. The computer program product of claim 7, wherein the software framework project further comprises a data view model and a data source for consumption by windows presentation foundation clients.

11. The computer program product of claim 7, wherein the software framework project further comprises a portable data model.

12. The computer program product of claim 7, wherein the data model comprises a Javascript object.

13. An apparatus, comprising:
    a memory;
    a processor coupled to the memory, wherein the processor is further configured to perform the steps of:

receiving, at a system modeler, a class comprising a plurality of attributes defining data and behavior of an application;

receiving, at the system modeler, a selection of at least a portion of the plurality of attributes for exposing through a graphical presentation interface; and generating, by the system modeler, a software framework project comprising a data model based, at least in part, on the received selection and the received class;

receiving an indication of a change in the class;

updating, by the system modeler, the data model based, at least in part, on the change in the class; and automatically regenerating, by the system modeler, an updated version of the software framework project based on the updated data model;

wherein the data model comprises a mashup view extending a DataViewModel as a partial class generated when an access layer is generated, the mashup view permits the DataView Model to be extended without a risk of overriding changes when regenerating the DatViewModel;

wherein the system modeler, having a client framework development module integrated using interface data models containing graphical presentation attribute definitions, interfaces a client framework runtime environment, and operates on a server, and wherein the client application operates on a remote client.

14. The apparatus of claim 13, wherein the software framework project comprises a .NET framework.

15. The apparatus of claim 13, wherein the processor is further configured to perform the step of generating a client application based, at least in part, on the software framework project.

16. The apparatus of claim 13, wherein the software framework further comprises at least one of a data view model, a data source, a portable data model, and a Javascript object.

* * * * *